United States Patent Office 2,740,226
Patented Apr. 3, 1956

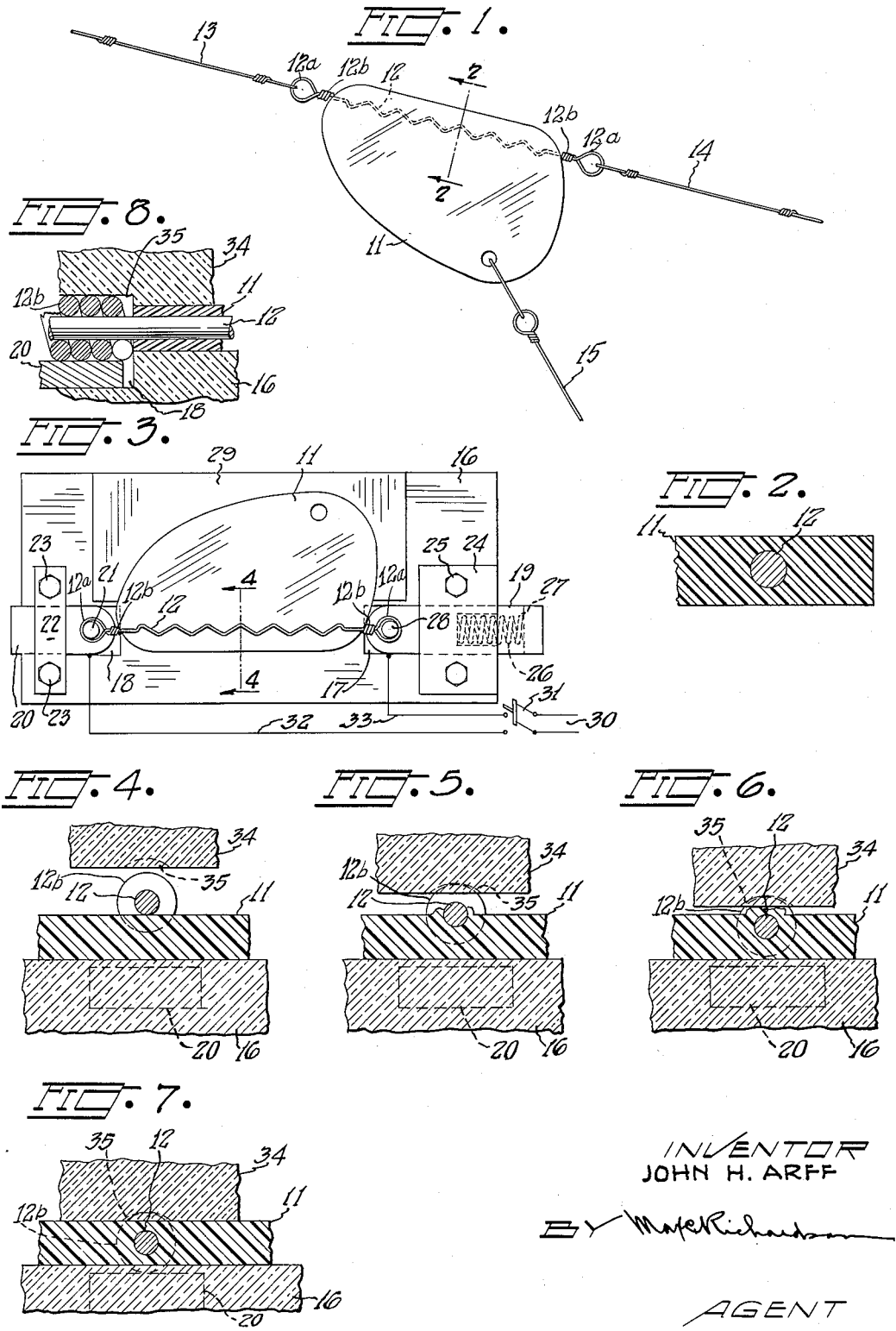

2,740,226

METHOD FOR ATTACHING A PLASTIC RUDDER ELEMENT TO A METAL LINE ADAPTED FOR FISHING

John H. Arff, Portland, Oreg.

Application April 10, 1951, Serial No. 220,178

1 Claim. (Cl. 43—42.53)

This invention relates generally to the art of embedding an element of material which softens at a relatively higher temperature in an element of material which softens at a relatively lower temperature, and more particularly to a method of securing a transparent plastic rudder element to a stainless steel wire section in a fishing line.

In trolling for game fish in the coastal rivers of the Pacific Ocean, it is customary to use a line with one or more hooks near its trailing end and a branch line for trailing a sinker weight attached to the first line some distance ahead of the hook. Usually from the branch to their trailing ends both lines are of metal such as stainless steel. Between the branch and hook on the first line one or more lures are applied or inserted according to the judgment of the fisherman. This gear generally, when trolled, develops an erratic movement which, together with the twist of the fishing line ahead of the branch, might cause the line to twist or roll and adversely affect the sinker branch line. Various forms of wire bridles have been used in the past to connect the main line from the fisherman's reel to the hook line and the sinker line at the branch location, but these have not been altogether satisfactory. It has, therefore, become a custom to use a line stabilizer or rudder at this branch point in order to prevent the erratic movement and rotation of the line. The stabilizer or rudder commonly has three locations arranged triangularly thereon for attachment of the main line, the hook line and the sinker line.

Laws have been passed limiting the number of flashing spinners or other brighter colored elements attached to the line for attracting the attention of the game fish and, therefore, it has been found undesirable to make the line stabilizer or rudder in a form or of a material which will be considered a lure and thus require the elimination of a more effectively designed or placed lure on the hook line. It has, therefore, been found desirable to make the line stabilizer or rudder from a sheet of transparent plastic approximately one-sixteenth inch thick. A satisfactory plastic material for the purpose and from which the commercial forms of this invention have been made is cellulose acetate. Or if desired an acrylic plastic available under the trade name "Lucite" may be used.

Such transparent plastic rudders have been made with line holes formed therein and in some cases these holes in the plastic sheet have been finished with metal eyelets. In either case it has been found that occasionally large fish have been lost by tearing the line from the plastic.

It is, therefore, the principal object of this invention to provide a method for attaching a transparent plastic rudder to a section of metal fishing line without breaking the continuity of the line at the rudder.

It is a second object to provide a process of embedding the metal fishing line in the plastic rudder in a desired wire pattern below the surfaces of the plastic rudder.

It is a third object to provide a method for permanently embedding below the surface of a single sheet of a relatively low melting point, electrically non-magnetic, and non-conducting material and electrically heatable element of a relativey high melting point material.

It is a fourth object to provide a method for locating an element of a plastic sheet in a fixed position holding a metal wire in a position movable perpendicularly to the surface of said element, heating said wire, and pressing said wire below the surface of said sheet as said sheet softens locally in the vicinity of said wire due to the elevated temperature of the wire, then cooling said sheet and said wire with the wire in its embedded position in said sheet.

How these and other objects are attained will be apparent from the following description referring to the attached drawing, in which:

Fig. 1 is a view in side elevation of the rudder of this invention showing the attachment of lines thereto.

Fig. 2 is a section along the line 2—2 of Fig. 1.

Fig. 3 is a plan view of a press below the ram adapted to the method of this invention showing a rudder in place on the press bed and the line in place ready to be embedded in the rudder.

Figs. 4 to 7, inclusive, are section views along the line 4—4 of Fig. 3, showing the progressive steps of embedding the fishing line wire into the plastic rudder, and showing a portion of the press ram.

Fig. 8 is a fragmentary sectional view taken perpendicularly to the broad surfaces of the rudder element longitudinally to the wire at the completion of the embedding process in the press.

Referring now to the drawing, the numeral 11 refers to the transparent plastic rudder of this invention and 12 to the section of metal wire fishing line embedded therein. In use the line 13 connects the rudder with the fisherman's reel, line 14 attaches the fish hook to the rudder and line 15 attaches a line weight or sinker to the rudder.

Fig. 2 shows a fragmentary cross section of the rudder along the line 2—2 of Fig. 1. At 16 is shown the flat bed plate or platen of a common form of hand-operated press recessed at 17 and 18 to receive wire holders 19 and 20 respectively. When wire holder 20 has been so located in slot 18 that wire pin 21 upstanding on holder 20 is positioned to locate wire 12 with respect to rudder 11, holder 20 is secured in place by clamp 22 drawn towards platen 16 by cap screws 23 threaded into platen 16. Holder 19 is slidably held in recess 17 by clamp 24 secured to platen 16 by screws 25. Holder 19 is biased for longitudinal movement outward from the platen by spring 26 guided in a hole in the platen as indicated in dotted lines on Fig. 3. Spring 26 presses outwardly on a lip depending from holder 19 as indicated by dotted lines 27. Wire pin 28 is upstanding on the inner end of holder 19. Jig plate 29 is secured to platen 16 in position to fix rudder 11 immovably in place during the operation of embedding wire 12 thereinto.

When it is desired to embed a wire 12, pre-formed as shown, into a plastic rudder 11, the rudder 11 is located as shown in Fig. 3 in jig 29 on platen 16. One end of wire 12 is hooked over stationary pin 21 and holder 19 is pushed inwardly against the bias of spring 26 to a position where the other end of wire 12 is hooked over movable pin 28. Then holder 19 is released and spring 26 places wire 12 in tension between pins 21 and 28 along which wire 12 is vertically movable. Wire 12 is then energized from low voltage supply line 30 through switch 31, wires 32, 33, conducting holders 19, 20, and conducting pins 21, 28. Wire 12 heats up and the press ram (not shown) faced with a flat, non-conducting, hard and rigid material like porcelain 34 is lowered onto wire 12.

As shown in Figures 1, 3 and 8 of the drawing the wire 12 is formed at each end with a loop 12a and the ends of the wire are wrapped back around the wire as at 12b to maintain and strengthen the loops 12a which are large enough to be freely vertically pushable along pins 21, 28 as noted above. In Figures 4 to 7, inclusive, with the wire 12 in the positions shown the position of the wire end wrap 12b is indicated by the circle of its outside diameter 12b.

It should be particularly noted that holders 19 and 20 are recessed below the surface of platen 16 and porcelain 34 is recessed above its ram surface, as at 35, in order to clear the coiled ends of wire 12 and leave wire 12 centered in plastic rudder 11 as the ram stroke is finished. This feature is clearly indicated longitudinally of the wire in Fig. 8 and transversely of the wire in Figs. 4 to 7, inclusive, which in sequence show the progressive movement of the wire into the plastic as the wire is heated and the porcelain face 34 of the ram is lowered.

In Figs. 4 to 8, the recess in the porcelain face 34 is indicated by the numeral 35 and it is clear that the wire is pressed into position by pressure on the coiled ends, 12b, of the wire by the surface of recess 35 in the porcelain and that between its coiled ends, 12b, it is the softening of the plastic by the heated wire and the stiffness of the wire that assures the proper placement of the wire 12 in the plastic rudder 11.

As the surface of recess 35 in porcelain 34 moves downward contacting end coils 12b of wire 12 and pushing wire loops 12a along pins 21 and 28 the progressive embedment into plastic rudder 11 of the portion of wire 12 which overlays rudder 11 is shown in Figures 4 to 7 and 8. At about the positions of wire 12 shown in Figures 5 or 6, switch 30 is opened since no additional heat will be needed thereafter.

Also, it should be noted that as the relatively cool porcelain 34 contacts the softened plastic surface 11 near the end of the ram stroke after wire 12 has been de-energized, the surface of plastic 11 is again flattened and its cooling hastened by the porcelain contact.

Although the process of this invention has been described and illustrated as it is practiced in making the fishing line rudder of this invention, it is apparent that the process will be successful and desirable in embedding a metallic element in a heat softening plastic body of many types for many uses.

Also, in the example illustrated and described, the embedded wire is shown to be regularly deformed in a plane parallel to the rudder but it is to be understood that the process is equally successful with a straight wire or with the wire formed into other designs.

Having thus described my invention and a preferred form of practicing same, together with a new and useful result of said practice, I claim:

The method of making a fishing line rudder or the like having a body of heat softenable sheet plastic material securely fixed between the ends of a metal wire adapted to form a section of a fishing line, said method comprising securing said body with one side and two opposite edges exposed, locating said wire adjacent said exposed side of said body with the ends of said wire extending beyond said exposed edges of said body, holding said wire in tension by its ends, heating said wire, moving said wire by its ends to contact said body across its exposed face to soften said body under its line of contact with said wire, moving said wire solely by pressure on its ends extending beyond said body to a desired position within the softened part of said body, and pressing said surface of said body over its softened area to reform said surface as said wire and said body cools.

References Cited in the file of this patent

UNITED STATES PATENTS

| | | |
|---|---|---|
| 1,366,674 | Matthews | Jan. 25, 1921 |
| 1,248,593 | Arnold | Dec. 4, 1917 |
| 1,447,059 | Benson | Feb. 27, 1923 |
| 1,739,246 | Majce | Dec. 10, 1929 |
| 1,802,295 | Wear | Apr. 21, 1931 |
| 2,006,604 | Post | July 2, 1935 |
| 2,115,375 | Warner | Apr. 26, 1938 |
| 2,119,504 | Lawrence | May 23, 1938 |
| 2,235,600 | Ammerman | Mar. 18, 1941 |
| 2,237,152 | Larmour | Apr. 1, 1941 |
| 2,247,558 | Nichols | July 1, 1941 |
| 2,350,572 | Schweigert | June 6, 1944 |
| 2,392,335 | Morrill | Jan. 8, 1946 |
| 2,435,730 | Worden | Feb. 10, 1948 |
| 2,518,487 | Metz | Aug. 15, 1950 |
| 2,552,999 | Pannell et al. | May 15, 1951 |

FOREIGN PATENTS

| | | |
|---|---|---|
| 22,001 | Great Britain | 1909 |
| 560,221 | Great Britain | Mar. 24, 1944 |